May 13, 1969
H. G. RUNNINGS
3,443,507
PIVOTABLE WALL VENT CONTROL DOOR WITH
RECESSED ACTUATOR THEREFOR
Filed Sept. 1, 1967
Sheet _1_ of 2
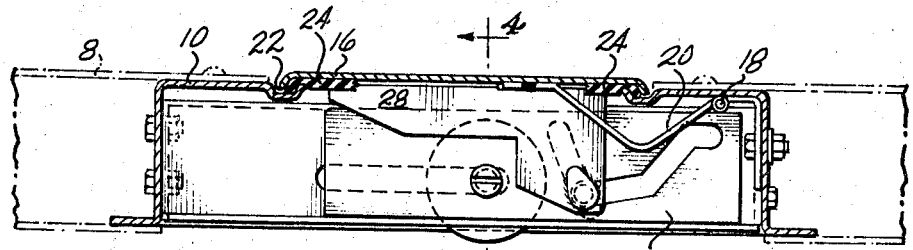
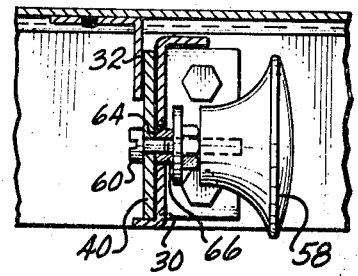
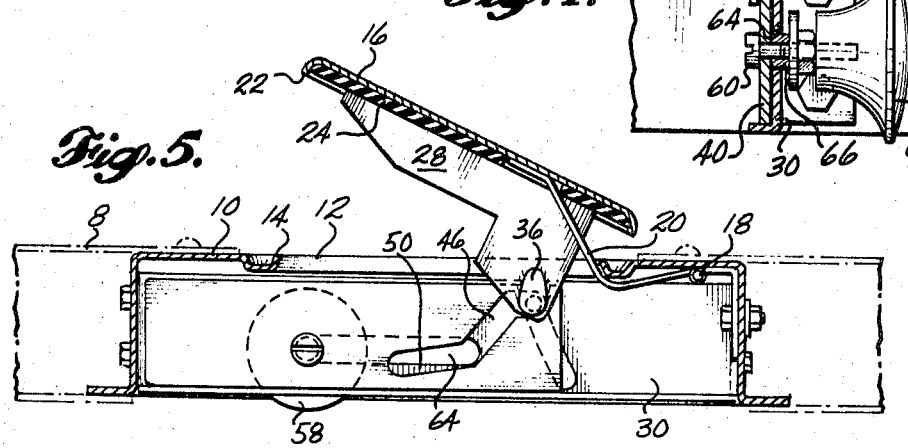
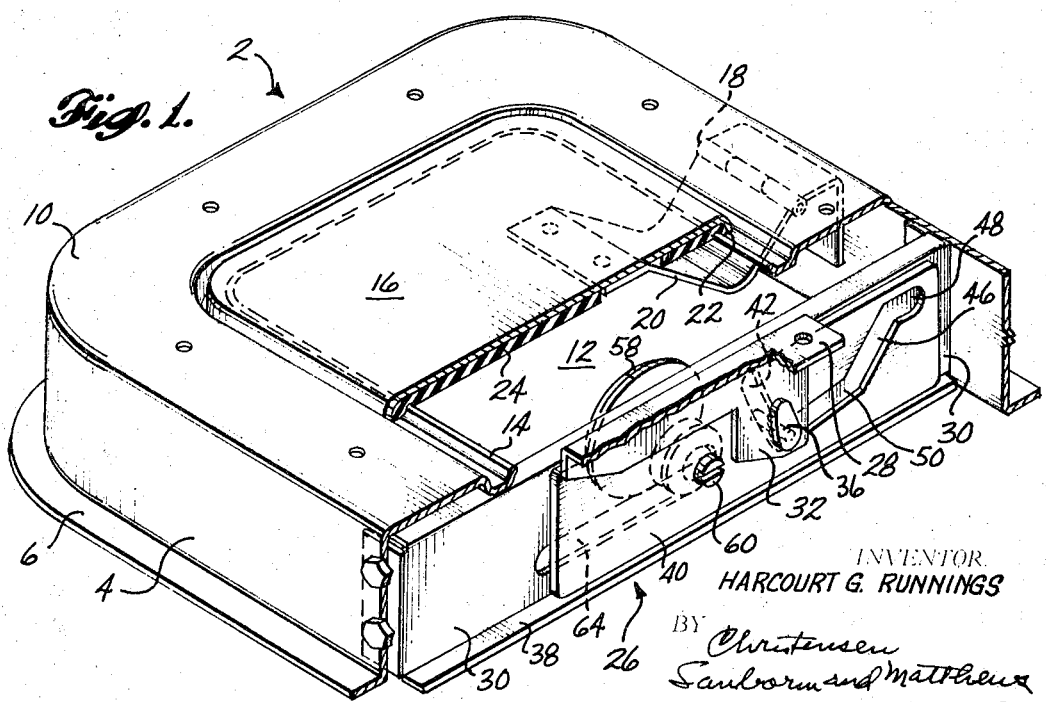
INVENTOR.
HARCOURT G. RUNNINGS
BY Christensen
Sanborn and Matthews
ATTORNEYS

United States Patent Office 3,443,507
Patented May 13, 1969

3,443,507
PIVOTABLE WALL VENT CONTROL DOOR WITH RECESSED ACTUATOR THEREFOR
Harcourt G. Runnings, 132 S. Spokane St.,
Seattle, Wash. 98134
Filed Sept. 1, 1967, Ser. No. 665,143
Int. Cl. F24f 7/04, 13/06
U.S. Cl. 98—41                                    7 Claims

ABSTRACT OF THE DISCLOSURE

A wall vent is disclosed in which there is an air inlet in the outside of the wall, a door which is pivotally supported on the wall to control the flow of air through the inlet, and an actuating mechanism which is recessed in the wall and operative to open and close the door. The actuating mechanism comprises means defining a guideway in the wall, an actuator slidably engaged in the guideway to move in a path which is generally parallel to the plane of the inlet, a cam track on the actuator, and cam means pivotally supported at a fixed point on the door in cooperative engagement with the cam track whereby movement of the actuator causes movement of the cam means in the cam track to pivot the door on the wall.

Field of the invention

This invention relates to ventilator assemblies, and in particular to wall vent assemblies which are equipped with pivotable control doors that are opened and closed by an actuating mechanism which is recessed in the wall. The invention is especially applicable to the actuation of the control doors for the vents of truck and automobile cabs, and accordingly, will be particularly described with reference to such application.

Background of the invention including certain objects thereof

Modern safety codes for the construction of truck and automobile cabs require that there be a minimum of parts and components which protrude within the interior of the cab and pose a hazard to occupants at the time of an accident. In fact, the most recently enacted codes require that the sleeping compartments of large interstate commerce trucks be free of all such parts and components, including the control doors, handles and other components of the wall vents by which the compartments are ventilated.

One object of the present invention is to provide a wall vent assembly for such a compartment which has a pivotable control door that is actuated by a mechanism which is fully recessed within the thickness of the wall. Another object of the invention is to provide a wall vent assembly of this nature which, together with the aforesaid actuating mechanism, can be housed within a wall of no more than 1½ to 2 inches in thickness. A still further object is to provide a wall vent assembly of this nature in which the aforesaid actuating mechanism can be operated by a force applied in directions running generally parallel to the extent of the wall. Still other objects include the provision of an assembly of this nature wherein the door can be operated outwardly into the air stream to function as a scoop, and the actuating mechanism therefor can be disposed at a location opposite the closed position of the door. They also include the provision of an assembly of this nature which can be remotely operated; which can be operated without lubricant; which forcibly retains the door in its closed position and maintains a tight seal about the rim of the door during closure; which friction locks the door at intermediate positions between the fully open and closed positions thereof; which can be made up as a flat one-piece unit, apart from the vehicle, for easy handling, storage, shipping and installation; which does not require a captive rubber seal, and to the contrary can use a plain flat seal of rubber or other resilient material which also serves as insulation and can be easily replaced; which is equipped with a removable door that can be adjusted in position; and which in operation adjusts to changes in the compressibility of the seal so that the closure force on the door continually compensates for wear in the seal. Additional objects will also be apparent from the description of the invention which follows hereafter.

Summary of the invention

These objects and advantages are realized by a ventilator assembly of my invention which has an air inlet, a door which is pivotally supported on the assembly to control the flow of air through the inlet, and an actuating mechanism which is operative to open and close the door. The latter mechanism comprises means defining a guideway on the assembly, an actuator slidably engaged in the guideway to move in a path which is generally parallel to the plane of the inlet, a cam track on the actuator, and cam means pivotally supported at a fixed point on the door in cooperative engagement with the cam track whereby movement of the actuator causes movement of the cam means in the cam track to pivot the door on the assembly. Preferably, the path of the actuator extends opposite the inlet, on the other side thereof from the door. In this way it is possible to locate substantially the entire actuating mechanism within the projected area of the inlet, as for example where the inlet is defined by a short tubular frame commonly known as a "shadow box," and the path of movement of the actuator is wholly within the interior of the frame.

It is also preferred to slidably support the actuator on the frame. For example, there may be a plate bracket disposed opposite the inlet on the aforesaid other side thereof, and the actuator may be slidably supported on this bracket. In certain of my preferred embodiments, the actuator is suspended on the bracket by pairs of pin and slot connections therebetween. One of the pins has a control knob thereon by which the actuator can be manually operated. In other embodiments, the actuator may be operated by a Bowden wire assembly.

In all of the preferred embodiments of the invention, the cam track takes the form of a dogleg slot of three sections, the intermediate of which drives the door between the open and closed positions thereof, one end section of the slot being substantially parallel to the path of movement of the actuator to lock the door in its open position, and the other end section thereof having a slight inclination to the path of movement of the actuator, to apply sealing pressure to the door when it is in the closed position.

One of these preferred embodiments is illustrated in the accompanying drawings wherein:

FIGURE 1 is a perspective view of a shadow box assembly made up in accord with the invention and having certain portions thereof removed to reveal elements of the assembly therebelow;

FIGURE 3 is a cross sectional view through the assembly at the level of the actuating mechanism, when the assembly is mounted on a wall and the door is in its closed and fully sealed position;

FIGURE 4 is a part cross sectional view along the line 4–4 of FIGURE 3; and

FIGURE 5 is another cross sectional view of the wall-mounted assembly at the level of the actuating mechanism when the door is in its open and locked position.

Figure 2:
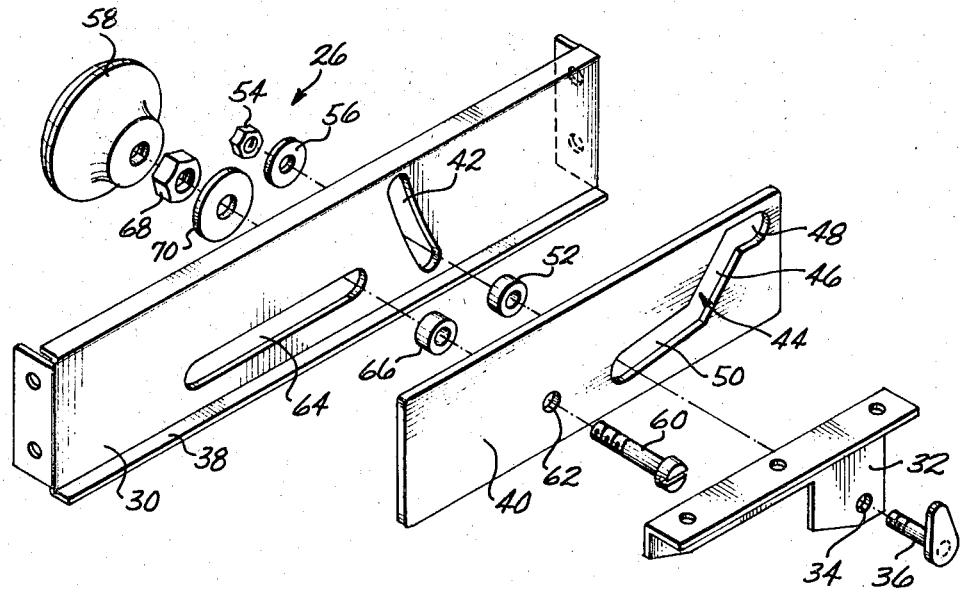
FIGURE 2 is an exploded view of the actuating mechanism for the vent control door in the assembly.

Referring to FIGURES 1, 3 and 5, it will be seen that the shadow box 2 comprises a short, tubular frame 4 which is sized to correspond to the wall thickness of a truck cab and equipped with an outwardly directed flange 6 on one end thereof for engagement of the frame in the hollow paneled wall 8 of the cab. The other end 10 of the frame is partially closed and has an air inlet 12 therein, the edge of which is indented to form an annular lip 14 thereabout. The inlet is controlled by a rectangular door 16 which is sized to fit over the lip, and pivotally connected to the frame so as to swing in a path outside of the plane of the inlet. The connection is made by a gate hinge 18 which is welded or otherwise secured to the inside of the frame on one side of the inlet, and has a curved generally L-shaped arm 20 on which the door is carried outside of the frame. In the fully open position of the door shown in FIGURE 5, the curved arm 20 of the hinge accommodates the adjacent edge portion of the inlet to the extent that the door forms a substantial opening for the inlet. On the other hand, as the door is closed, the arm draws it tightly against the lip 14, there being an inwardly directed flange 22 on the rim of the door that seats behind the lip and forms a labyrinthian seal therewith. In addition, a flat rubber pad 24 is adhesively bonded or otherwise secured to the inside face of the door to be compressed over the rim of the lip as the door is applied against it. The pad creates an airtight seal about the lip and also serves to insulate the inlet opening.

The door is opened and closed by an actuating mechanism 26 which is mounted within the frame. The mechanism comprises a pair of cooperatively disposed cam brackets 28 and 30, one of which 28 is mounted on the door and the other of which 30 is mounted across the interior of the frame. The door-mounted bracket 28 is essentially a right angular bar with a projecting flange 32 on one side, having an aperture 34 therein. The bar is positioned horizontally and welded or otherwise secured to the inside face of the door so that the flange 32 projects into the frame, and a threaded pin 36 is passed upward through the aperture 34 and welded to the flange 32 to form a cam on the door. The frame-mounted bracket 30, on the other hand, is essentially a flat rectangular bar which is upwardly flanged at its ends to be bolted to the side walls of the frame as illustrated. It also has a pair of longitudinally extending flanges 38 which depend from its edges and extend the full length of the bar to form a guideway for a cam plate 40 slidably engaged thereunder. Both the guide bar 30 and the cam plate 40 have operatively superposed slots to receive the cam pin 36 on the door. The slot in the guide bar 30 is seen at 42, and is formed in an arcuate path about the pivotal axis of the door. The slot in the plate is identified by numeral 44, and takes the form of a dogleg having three sections, the intermediate of which 46 is angled to the length of the guide bar 30, crosswise of the slot 42 therein. The remaining sections form the ends of the slot 44 and as seen in the drawings, the upper end section 48 is substantially parallel to the length of the guide bar 30. The lower end section 50, on the other hand, is inclined at a slight angle of approximately 9° to the length of the bar 30. When the mechanism is assembled, the flange 32 on the door bracket 28 is positioned below the guide bar and cam plate assembly, and the cam pin 36 is passed upward through the slots 42 and 44 therein. A cam roller 52 is slipped over the pin to float rotatably in the plate slot 44, and a nut 54 is threaded onto the pin, over a washer 56, to loosely secure the arrangement.

In operation, the cam plate 40 is driven lengthwise of the guide bar 30 to shift it in relation to the roller 52 and pin 36. The driving force is manually applied through a knob 58 which is attached to the plate 46 by means of a machine screw 60 which is passed upwardly through an aperture 62 in the plate 46, and thence through a longitudinally extending slot 64 in the bar 30. The shank of the screw 60 carries a cam roller 66, and a nut 68 is threaded onto the screw, over a washer 70, to loosely secure the arrangement for manipulation by the knob 58. Note FIGURE 4 wherein it can be seen that the roller 66 floats rotatably in the slot 64 when the plate 40 is driven by the knob 58.

Functionally, the intermediate section 46 of the plate slot 44 acts as a slidably guided cam track for driving the cam pin 36 through an arcuate path. As the pin reaches the upper limit of the intermediate section, the door assumes its fully open position, and any additional movement of the plate thereafter is by way of locking the door in this position. As seen in FIGURE 3, the pin 36 moves into the upper end section 48 of the slot 44 and is effectively locked against movement by any force applied to it other than through the plate 46. When the pin reaches the lower limit of the intermediate section 46, the door assumes its fully closed position, and additional movement of the plate employs the lower end section 50 of the slot 44 as a wedge to compress the pad 24 more tightly against the lip 14. Of course, the extent to which the pin 36 moves into this end section varies with the compressibility of the pad, and as the pad wears away, the pin is moved even deeper into it to compensate for the wear.

The event may be directly assembled on the wall of the cab, as by mounting both the door and the bracket 30 on the outside skin of the wall. Or it may be assembled in other forms apart from the wall, as by mounting the door and bracket 30 on a flat plate having an aperture therein to serve as the inlet.

I claim as my invention:

1. In a ventilator assembly having an air inlet defined by a short tubular frame, a door which is pivotally supported on the assembly to control the flow of air through the inlet, and an actuating mechanism which is operative to open and close the door, said mechanism comprising means defining a guideway on the assembly, an actuator slidably engaged in the guideway to move in a path which is generally parallel to the plane of the inlet, wholly within the interior of the frame, on the other side of the inlet from the door, a cam track on the actuator, and cam means pivotally supported at a fixed point on the door in cooperative engagement with the cam track whereby movement of the actuator causes movement of the cam means in the cam track to pivot the door on the assembly.

2. The ventilator assembly according to claim 1, wherein the actuator is slidably supported on the frame.

3. A wall vent having intercommunicating air inlets in the inside and outside of the wall, a door which is pivotally supported on the wall to control the flow of air through the outside inlet, and an actuating mechanism which is interposed in the wall between the inlets and operative to open and close the door, comprising means defining a guideway in the wall, an actuator slidably engaged in the guideway to move in a path which is generally parallel to the plane of the inlet, a cam track on the actuator, and cam means pivotally supported at a fixed point on the door in cooperative engagement with the cam track whereby movement of the actuator causes movement of the cam means in the cam track to pivot the door on the wall.

4. In a ventilator assembly having an air inlet, a door which is pivotally supported on the assembly to control the flow of air through the inlet, and an actuating mechanism which is operative to open and close the door, said mechanism comprising a plate bracket disposed opposite the inlet on the other side thereof from the door, an actuator slidably supported on the bracket to move in a path which is generally parallel to the plane of the inlet, a cam track on the actuator, and cam means pivotally supported at a fixed point on the door in cooperative engagement with the cam track whereby movement of the actuator causes movement of the cam means in the cam track to pivot the door on the assembly.

5. The ventilator assembly according to claim 4, wherein the actuator is suspended on the bracket by pairs of pin and slot connections therebetween.

6. The ventilator assembly according to claim 5 wherein one of the pins has a manually operated control knob thereon.

7. In a ventilator assembly having an air inlet, a door which is pivotally supported on the assembly to control the flow of air through the inlet, and an actuating mechanism which is operative to open and close the door, said mechanism comprising means defining a guideway on the assembly, an actuator slidably engaged in the guideway to move in a path which is generally parallel to the plane of the inlet, a cam track on the actuator, and cam means pivotally supported at a fixed point on the door in cooperative engagement with the cam track whereby movement of the actuator causes movement of the cam means in the cam track to pivot the door on the assembly, the path of the actuator extending opposite the inlet, on the other side thereof from the door, and the cam track taking the form of a dogleg slot of three sections, the intermediate of which drives the door between the open and closed positions thereof, one end section of the slot being substantially parallel to the path of movement of the actuator to lock the door in its open position, and the other end section thereof having a slight inclination to the path of movement of the actuator, to apply sealing pressure to the door when it is in the closed position.

References Cited

UNITED STATES PATENTS

| | | | |
|---|---|---|---|
| 1,242,541 | 10/1917 | Gage | 98—2 |
| 1,813,380 | 7/1931 | Bonbright | 98—2 |
| 2,443,454 | 6/1948 | Hennessy | 98—2 |
| 2,514,772 | 7/1950 | Kramer | 98—2 XR |

MILTON KAUFMAN, *Primary Examiner.*

M. ANTONAKAS, *Assistant Examiner.*

U.S. Cl. X.R.

98—2